UNITED STATES PATENT OFFICE.

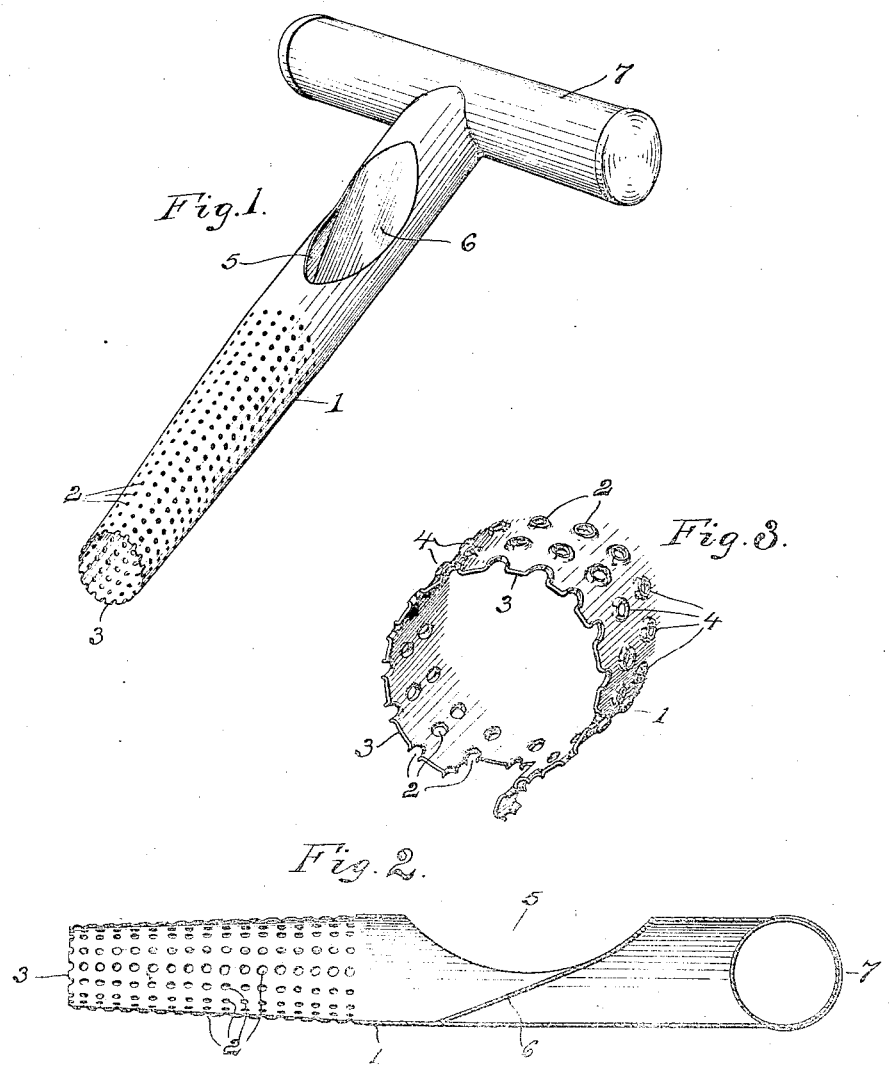

FERDINAND C. ROBERTS, OF DETROIT, MICHIGAN.

CORER.

No. 917,660.     Specification of Letters Patent.     Patented April 6, 1909.

Application filed January 13, 1908. Serial No. 410,527.

*To all whom it may concern:*

Be it known that I, FERDINAND C. ROBERTS, a citizen of the United States of America, residing at Detroit, in the county of Wayne and State of Michigan, have invented certain new and useful Improvements in Corers, of which the following is a specification, reference being had therein to the accompanying drawings.

This invention relates to certain improvements in a corer for fruits and vegetables, whereby the corer has a positive cutting action which clears its path as it enters so there is no tendency to split or break open the fruit, and whereby the core itself is readily ejected from the instrument after extraction, provision also being made for renewal of the main cutting edge.

The invention consists in the matters hereinafter set forth, and more particularly pointed out in the appended claim.

In the drawings, Figure 1 is a view in perspective of a corer embodying features of the invention. Fig. 2 is a view in longitudinal section of the corer. Fig. 3 is a view in detail, greatly enlarged, showing cutting burs on the outer surface of the corer body, and the method of renewing the cutting edge.

Referring to the drawings, the body of the corer is a slightly tapered tube 1 of thin sheet metal which is perforated for a portion of its length from its smaller end, the perforations 2 being symmetrically disposed in rings so as to present successive zones of weakened metal between bands of imperforate metal. The outer smaller end has a serrated cutting margin or lip 3 formed by severing the tube through a ring of the apertures which may be easily accomplished as shown in Fig. 3, by making a longitudinal cut from this end into an adjacent aperture through the outer imperforate band, and then tearing off this band, the metal readily breaking along the row of holes. The burs 4 formed in punching or piercing the plate or blank from which the tube is rolled, are on the outside of the tube.

An elongated slot 5 in the shank of the corer beyond the perforated portion with a tongue 6 obliquely secured across the tube allows the contents of the corer to be pushed out. A handle 7 of any convenient form and material completes the implement.

In operation, the corer is thrust into the fruit with a rotary motion, the serrated lip cutting out a clean cylinder which passes back readily through the expanding bore of the tube. The outer burs cut away the surrounding material, the shreds entering the tube with the core, and thus room is made for the body of the corer which does not, therefore, split or disrupt the fruit. When the cutting lip is so worn as to be ineffective, the outer imperforate band may be cut through and torn off, thereby renewing the lip.

What I claim as my invention is:—

A fruit and vegetable corer comprising a sheet metal tube having an imperforate body provided with a longitudinal discharge slot and an obliquely disposed tongue opposite the slot closing the tube, a handle on one end of the body, and a tapered portion having a series of zones weakened by perforations whose margins form outwardly projecting burs, the smaller open end of the tube having a serrated cutting edge formed by severing the tube wall along the medial line of any one of the weakened perforated zones.

In testimony whereof I affix my signature in presence of two witnesses.

FERDINAND C. ROBERTS.

Witnesses:
   C. R. STICKNEY,
   OTTO F. BARTHEL.